United States Patent
Kim et al.

(10) Patent No.: US 10,341,645 B2
(45) Date of Patent: Jul. 2, 2019

(54) BACKLIGHT AND IMAGE DISPLAY DEVICE USING THE SAME

(71) Applicant: LG DISPLAY CO., LTD., Seoul (KR)

(72) Inventors: HanSeok Kim, Paju-si (KR); JoonYoung Park, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 156 days.

(21) Appl. No.: 14/848,744

(22) Filed: Sep. 9, 2015

(65) Prior Publication Data
US 2016/0080735 A1 Mar. 17, 2016

(30) Foreign Application Priority Data

Sep. 11, 2014 (KR) .................. 10-2014-0120360

(51) Int. Cl.
| | |
|---|---|
| *G02F 1/1335* | (2006.01) |
| *H04N 13/398* | (2018.01) |
| *F21V 7/04* | (2006.01) |
| *G02B 27/22* | (2018.01) |
| *F21V 9/30* | (2018.01) |
| *H04N 13/302* | (2018.01) |
| *F21V 8/00* | (2006.01) |
| *F21Y 105/00* | (2016.01) |
| *F21Y 115/30* | (2016.01) |
| *F21Y 115/15* | (2016.01) |
| *F21Y 115/10* | (2016.01) |

(52) U.S. Cl.
CPC ............ *H04N 13/398* (2018.05); *F21V 7/04* (2013.01); *F21V 9/30* (2018.02); *G02B 6/0031* (2013.01); *G02B 6/0038* (2013.01); *G02B 6/0068* (2013.01); *G02B 27/225* (2013.01); *G02B 27/2235* (2013.01); *H04N 13/302* (2018.05); *F21Y 2105/00* (2013.01); *F21Y 2115/10* (2016.08); *F21Y 2115/15* (2016.08); *F21Y 2115/30* (2016.08)

(58) Field of Classification Search
CPC .. H04N 13/0497; H04N 13/0402; F21V 7/04; F21V 9/16; G02B 6/0031; G02B 6/0038; G02B 6/0068; G02B 27/2235; G02B 27/225
See application file for complete search history.

(56) References Cited

U.S. PATENT DOCUMENTS

| | | | |
|---|---|---|---|
| 2004/0141108 A1* | 7/2004 | Tanaka | G02B 6/0038 349/96 |
| 2010/0231491 A1 | 9/2010 | Mizuuchi et al. | |
| 2011/0228195 A1 | 9/2011 | Shikii et al. | |

(Continued)

FOREIGN PATENT DOCUMENTS

| | | |
|---|---|---|
| CN | 1483150 A | 3/2004 |
| CN | 103238090 A | 8/2013 |
| CN | 103299358 A | 9/2013 |

(Continued)

*Primary Examiner* — Christopher G Findley
(74) *Attorney, Agent, or Firm* — Dentons US LLP

(57) ABSTRACT

Provided is an image display device having a display panel and a light source that may include a light path conversion sheet on the display panel; and a reflecting plate on the light path conversion sheet, the reflecting plate reflecting a light emitted from the light source, wherein the light path conversion sheet directs the light reflected from the reflecting plate toward the display panel.

18 Claims, 9 Drawing Sheets

(56) References Cited

U.S. PATENT DOCUMENTS

2012/0063166 A1\* 3/2012 Panagotacos .......... G02B 6/002
  362/609
2013/0335821 A1\* 12/2013 Robinson ............. G02B 6/0023
  359/464

FOREIGN PATENT DOCUMENTS

| WO | 2012/174364 A2 | 12/2012 |
| WO | 2013/089172 A1 | 6/2013 |

\* cited by examiner

LIGHT LOSS

BACKLIGHT AND IMAGE DISPLAY DEVICE USING THE SAME

This application claims the benefit of Korean Patent Application No. 10-2014-0120360, filed on Sep. 11, 2014, which is hereby incorporated by reference for all purposes as if fully set forth herein.

BACKGROUND OF THE INVENTION

Field of the Invention

The present invention relates to a display device and a method for manufacturing the same, and more particularly, to a display device having a backlight unit with improved profile and efficiency.

Discussion of the Related Art

Stereoscopic image display devices may be divided into a stereoscopic technique and an autostereoscopic technique. The stereoscopic technique uses the parallex images of left and right eyes having a large stereoscopic effect, and includes a glasses technique and a glasses-free technique, both of which are in practical use.

The glasses technique displays right and left parallax images on a direct-view type display device or projector in an alternate manner and implements a stereoscopic image using polarized glasses or displays right and left parallax images in a time division manner and implements a stereoscopic image using shutter glasses.

The glasses-free technique divides the optical axes of right and left parallax images using an optical plate such as a parallex barrier, a lenticular lens sheet or switchable lens/barrier to implement a stereoscopic image. Due to its convenience of allowing the user to view a stereoscopic image without wearing shutter or polarized glasses, the glasses-free technique has been applied to small to medium-sized displays such as a smart phone, a tablet, a notebook, and the like in recent years.

A backlight unit of a display device employing such a glasses-free technique according to the related art will now be described with reference to FIGS. 1 and 2.

FIG. 1 is a schematic side view illustrating a display device having a backlight unit employing a glasses-free technique according to the related art.

Referring to FIG. 1, a glasses-free display device may include a wedge-type light guide plate 10 configured to change a light travelling direction, and a liquid crystal panel 20 disposed on an upper portion of the light guide plate 10 to implement an image through a light emitted from the light guide plate 10, and a LED light source array 30 disposed on a lateral surface of the light guide plate 10 to emit light into the light guide plate 10.

The wedge-type light guide plate 10 may include a thin end portion 10a corresponding proximately to the LED light source array 30, a thick end portion 10b corresponding to the thin end portion 10a, an outgoing light surface 10c in contact with the thin end portion 10a and thick end portion 10b to emit light toward the liquid crystal panel 20, and a bottom surface 10d formed with a plurality of step patterns 15 to correspond to the outgoing light surface 10c at a predetermined interval.

The thick end portion 10b of the light guide plate 10 is formed with a reflective curved surface 17, and the thin end portion 10a and outgoing light surface 10c are formed on a flat surface.

Referring to FIG. 2, the light emitted from the LED light source array 30 in a first direction may be guided to an inside of the wedge-type light guide plate 10 therethrough without meaningful loss, and the light reflected and propagated from the inside of the light guide plate 10 in a second direction is extracted from the light guide plate 10 to an outside thereof using the step patterns 15.

Referring back to FIG. 1, the light generated from the LED light source array 30 travels in the first direction to the thick end portion 10b along the length of the light guide plate from the thin end portion 10a of the light guide plate 10, and subsequently is reflected from the thick end portion 10b of the light guide plate 10. Then, when moving to the thin end portion 10a in the second direction along the length of the light guide plate, the light travels to the thin end portion 10a and at any position thereof along the length of the light guide plate, and is extracted from the light guide plate 10 through a mutual interaction with the step patterns 15. In other words, the light may be homogenized and extended while propagating in the first direction prior to being reflected from a non-flat surface, and extracted while propagating in the second direction.

The step patterns 15 of the light guide plate 10 may not substantially have an optical directional function for the light passing through the light guide plate from a first incident side to a second reflective side, thereby accomplishing a long rear working distance of the light reflective side as well as accomplishing a small thickness of the light guide plate.

FIG. 2 is a plan view illustrating a light guide plate for schematically explaining travelling states of light extracted through first and second light sources and a reflective curved surface of a backlight unit employing a glasses-free technique according to the related art. FIG. 3 is a simulation view schematically illustrating optical or light loss of a light guide plate of a backlight unit according to the related art.

Referring to FIG. 2, a beam 40 emitted from a first light source 30a in the wedge-type light guide plate 10 is directed to a first viewing window 60, and a beam 44 emitted from a second light source 30b is directed to a second viewing window 64 that is separated from the first viewing window 60 in a horizontal direction by the reflective curved surface 17 and step patterns 15 at the thick end portion 10b.

In particular, the light emitted from two LED light sources 30a, 30b enters the thin end portion 10a of the wedge-type light guide plate 10, and then is diffused in a fan-shaped manner to the thick end portion 10b at an opposite side formed with the reflective curved surface 17, wherein the optical path of the diffused beams 40, 44 is converted and reflected on the reflective curved surface 17 in a substantially parallel manner (distant reflective focal length).

The beams 40, 44 reflected in a substantially parallel manner through the reflective curved surface 17 are sent to the first and the second viewing window 60, 64, respectively, in a planar light source form through the step patterns 15 formed on the bottom surface 10f to implement a three-dimensional image display.

However, forming special micro-patterns such as the step patterns 15 of the wedge-type light guide plate 10 has been difficult in commercialization and mass production and expensive due to its high failure rate of more than 90% with current technologies.

Also, the thickness of an upper bezel may increase due to a reflective curved surface formed on an outgoing light surface of the wedge-type light guide plate, thereby causing design restrictions. In addition, such a lower step pattern structure of the wedge-type light guide plate may require precise machining by, for example, an injection molding method. However, it may be difficult to manufacture such a wedge-type light guide plate by an injection molding method in large-sized production, and even if precise machining is possible, a crushing phenomenon of the step pattern structure at a micro level may occur when PMMA mold resin, for example, is injected into the mold frame.

Moreover, the wedge-type light guide plate according to the related art may suffer optical loss at a lower end portion as illustrated in FIG. 3, and a much larger optical loss may occur when a lower step pattern structure of the wedge-type light guide plate is not precisely machined.

SUMMARY OF THE INVENTION

Accordingly, the present invention is directed to provide a display device and method of manufacturing the same that substantially obviates one or more problems due to limitations and disadvantages of the related art.

An advantage of the present invention is directed to provide a display device having a backlight unit with improved profile and efficiency.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a backlight unit for a display device, comprising: a light source; a light path conversion sheet adjacent to the light source; and a reflecting plate at an upper edge portion of the light path conversion sheet, the reflecting plate facing the light source and reflecting a light emitted from the light source toward the light path conversion sheet, wherein the light path conversion sheet directs the light reflected from the reflecting plate in a direction substantially perpendicular to a light travel direction between the light source and a center portion of the reflecting plate.

In another aspect of the present invention, an image display device may, for example, include a display panel configured to display a left-eye image and a right-eye image in a time division manner; a first light source configured to irradiate a first light during a first period of time in which the left-eye image is displayed and a second light source configured to irradiate a second light during a second period of time in which the right-eye image is displayed; a light path conversion sheet disposed adjacent to the first and second light sources; and a reflecting plate disposed to face the first and second light sources at an upper edge portion of the light path conversion sheet.

In yet another aspect of the present invention, an image display device having a display panel and a light source may, for example, include a light path conversion sheet on the display panel; and a reflecting plate on the light path conversion sheet, the reflecting plate reflecting a light emitted from the light source, wherein the light path conversion sheet directs the light reflected from the reflecting plate toward the display panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

An embodiment of the present disclosure may provide a backlight unit that is applicable to implementation of planar and stereoscopic images without a light guide plate and an image display device using the same. Such an element may be used for a directional backlight unit to provide a directional display including a stereoscopic image display. Moreover, an embodiment may provide a controlled light source for an efficient stereoscopic image display. In addition, an embodiment may relate to a directional backlight device and a directional display including the directional backlight device. Such a device may be used for a glasses-free stereoscopic image display, a privacy display and another types of directional displays.

An embodiment of the present disclosure may be used for various optical systems, display systems and projection systems. An embodiment may include various projectors, projection systems, optical elements, displays, micro displays, computer systems, processors, self-contained projection systems, visual and/or audio-visual systems, and electrical and/or optical devices or operated with one of them.

An aspect of the present disclosure may be used for any device including an optical and electrical device, an optical system, a display system, an entertainment system, a presentation system or any type of optical system in actuality.

Accordingly, an embodiment of the present disclosure may be used for an optical system, a device used for visual and/or optical presentation, a visual peripheral, or the like and various types of computing environments.

It should be understood by those skilled in the art that the present disclosure is not limited to the details of a specific configuration illustrated in the application and manufacture thereof since the present disclosure effectuates another embodiment. Moreover, an aspect of the present disclosure may be described with a different combination and configuration to define its own unique embodiment. Furthermore, technical terms used in the present disclosure are provided for the description thereof, but may not be necessarily limited to those terms.

Figure 1:
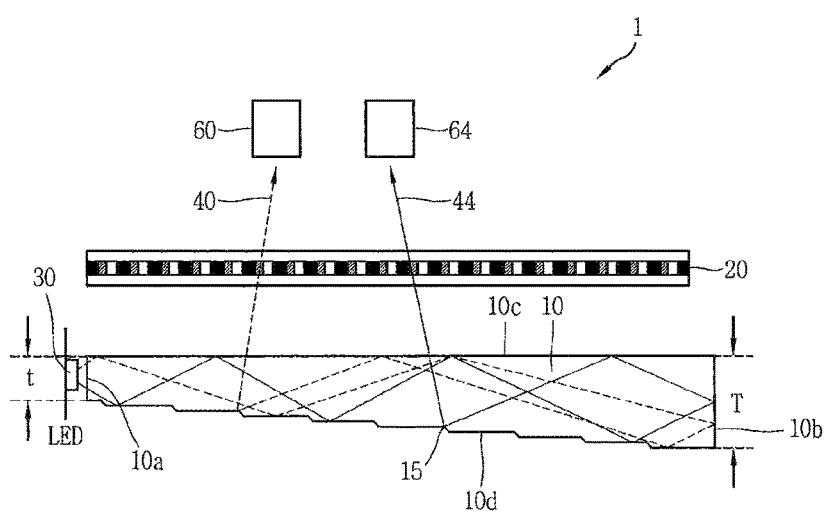
FIG. 1 is a schematic side view illustrating a display device having a backlight unit employing a glasses-free technique according to the related art.
Figure 2:
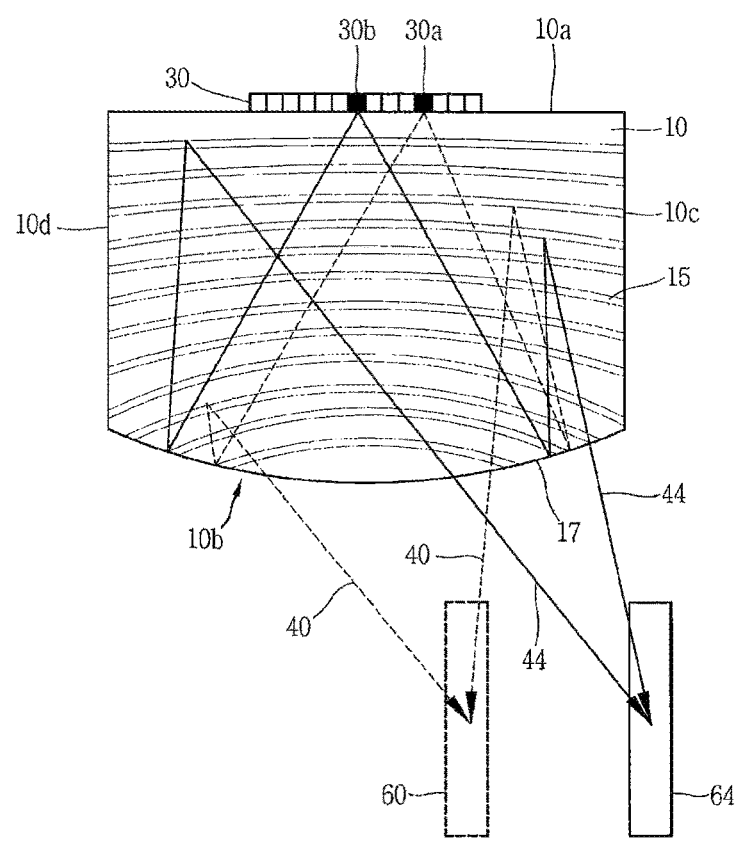
FIG. 2 is a plan view illustrating a light guide plate for schematically explaining travelling states of light extracted through first and second light sources and a reflective curved surface of a backlight unit employing a glasses-free technique according to the related art.
Figure 3:
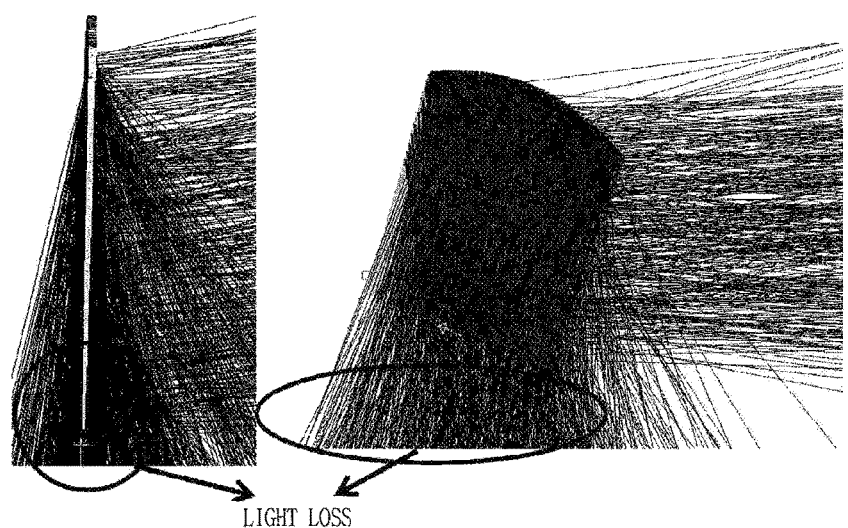
FIG. 3 is a simulation view schematically illustrating optical or light loss of a light guide plate of a backlight unit according to the related art.
Figure 4:
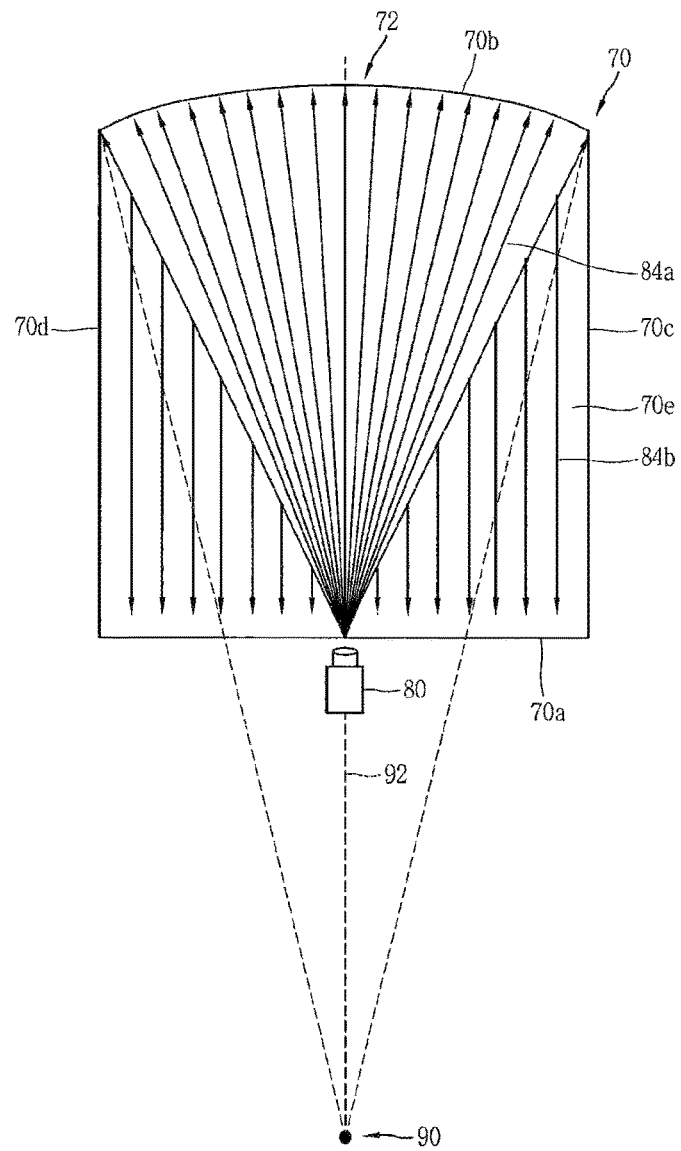
FIG. 4 is a schematic view illustrating paths through which beams from a light source propagate and are reflected from a reflective curved surface.

FIG. 4 is a schematic view illustrating paths through which beams from a light source propagate and are reflected on a reflective curved surface. FIG. 4 includes a light guide plate, but the light guide plate is illustrated only for discussion purposes. In other words, the light guide plate is illustrated to describe ways in which light propagates and is reflected on a reflective curved surface, and the present disclosure in fact describes various embodiments where a light guide plate is not employed.

The plan view of FIG. 4 includes a LED light source 80 that can be used to illuminate a light guide plate 70. Although the LED light source 80 is discussed as a light source in FIG. 4, any light source such as a laser light source, a local field emission source, an organic light emitting array (not limited to them), and the like may be used.

Referring to FIG. 4, beams 84a propagating in a first direction are guided through the light guide plate 70 without meaningful loss, and beams 84b propagating in a second direction can be extracted from the light guide plate 70 using a step pattern (not shown).

The light guide plate 70 is configured in such a manner that a light emitted from the LED light source 80 disposed adjacent to a light incident surface 70a of the light guide plate exits from the viewing surface 70e of the light guide plate 70.

The term "viewing surface" indicates that a rear surface (not shown) on an opposite side of the viewing surface 70e is closer to a viewer. The boundary of the viewing surface 70e and rear surface (not shown), respectively, is determined by lateral surfaces 70c, 70d, a light incident surface 70a and an opposite incident surface 70b. In FIG. 4, the viewing surface 70e faces a viewer viewing this page, and the rear surface (not shown) is hidden from the shape of the light guide plate 70.

Also, the light guide plate 70 is configured such that beams 84a injected into an optical interface of the light incident surface 70a are diffused through total reflection as approaching the opposite incident surface 70b.

A reflective curved surface 72 is bent with a uniform radius of curvature having a center of curvature 90, and the light source 80 injects light into a focal point of the reflective curved surface 72. The focal point is located at a half of the radius of curvature.

The beams 84a are reflected on the reflective curved surface 72 in parallel to each other and propagate along a length direction of the light guide plate 70. The beams 84a are redirected to the light incident surface 70a from the opposite incident surface 70b until the beams intersect the viewing surface 70e at a critical angle of reflection of the viewing surface 70e, and the beams 84b exit in parallel to a straight direction as collimated light.

In a case where a plurality of light sources are disposed adjacent to the light incident surface 70a along the light incident surface 70a, the lateral surfaces 70c, 70d of the light guide plate 70 are preferably, slightly shorter to allow a light source at one side of the center line to stay at a focal point of the reflective curved surface 72.

In particular, the beams 84a propagating from the LED light source 80 disposed adjacent to the light incident surface 70a of the light guide plate 70 provide fan-shaped primary beams that can propagate to the reflective curved surface 72 of the opposite incident surface 70b, and the beams 84b propagate in a length direction of the light guide plate 70 in substantially parallel thereto while being reflected from the reflective curved surface 72.

A backlight unit according to an embodiment of the present disclosure, which can be applied to a planar and stereoscopic image display device without a light guide plate and an image display device using the same, will now be described in detail based on the principle that the beams 84a emitted from a light source are diffused in a fan-shaped manner and reflected in parallel in a straight manner on the reflective curved surface 72.

Hereinafter, reference will be made in detail to exemplary embodiments of the present invention, examples of which are illustrated in the accompanying drawings. The same reference numbers will be used throughout this disclosure to refer to the same or like parts. In the following description, the detailed description may be omitted when a specific description for known functions or configurations to which the invention pertains is judged to obscure the gist of the present invention. The name of a constituent element used in the following description may be selected in consideration of facilitating the writing of the specification, and may be different from that of a component in the actual product.

Figure 5:
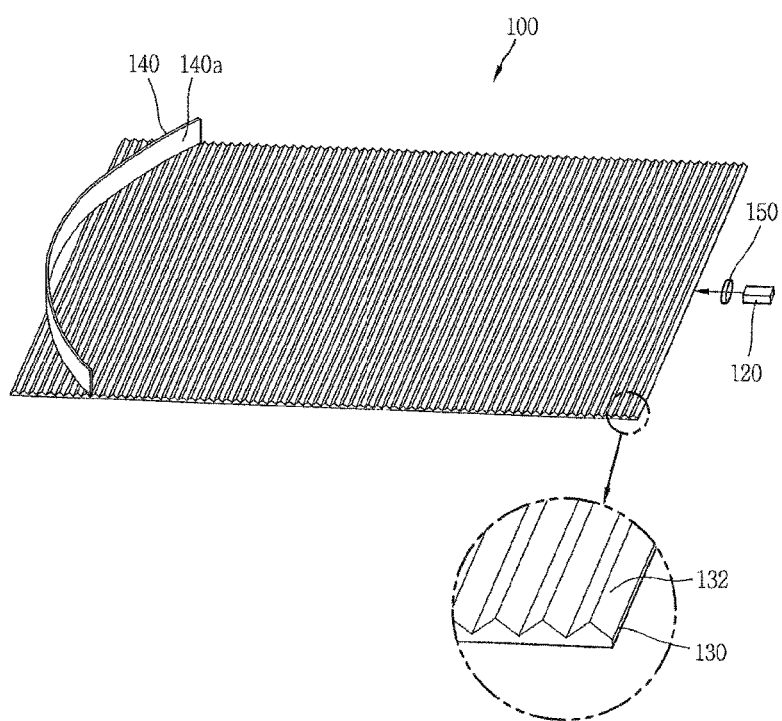
FIG. 5 is a combined perspective view schematically illustrating a backlight unit applied to an image display device according to an embodiment of the present disclosure.

FIG. 5 is a perspective view schematically illustrating a backlight unit applied to an image display device according to an embodiment of the present disclosure.

The present embodiment will be described with reference to a backlight unit applied to an image display device for implementing planar images. However, this is merely exemplary, and a backlight unit according to an embodiment of the present embodiment can be also applicable to a stereoscopic image display device for selectively driving at least two light sources to alternately display left-eye and right eye images in a time division manner.

Referring to FIG. 5, a backlight unit 100 according to an embodiment of the present disclosure may be disposed on a rear surface of the display panel (not shown, refer to reference numeral 200 in FIG. 7) to irradiate light to a front surface of the display panel 200.

The backlight unit 100 may include a light source 120 configured to provide light to the display panel 200, a light path conversion sheet 130 disposed adjacent to the light source, and a reflecting plate 140 disposed to face the light source 120 at an upper edge portion of the light path conversion sheet 130.

In this embodiment, a laser light source is used for the light source 120 by way of example, but any light source such as a LED light source, a local field emission source, an organic light emitting array (not limited to them), and the like can be also used in addition to the laser light source.

The light source 120 may have a shape extended in a length direction along a lateral surface of the light path conversion sheet 130, and may be formed with a single light source or a plurality of light sources arranged in a row. In other words, a single light source 120 is provided in FIG. 5, but the number and location of the light source 120 is not limited, and the light source 120 may include one or more light sources.

For example, when implementing planar images on the display panel 200 using the backlight unit 100 according to an embodiment of the present disclosure, one or a plurality of light sources used as the light source 120 may be driven at the same time to direct the light emitted from the light source(s) to the display panel 200. On the other hand, when implementing stereoscopic images on the display panel 200 using the backlight unit 100, one or a plurality of light sources used as the light source 120 can be individually turn on and off In other words, some of the plurality of light sources, for example, a first light source and a second light source, are controlled to be on, and the remaining light sources are controlled to be off, such that different images are viewed from the viewer's left-eye and right-eye through the display panel 200 to implement a stereoscopic image. Here, each of the first and the second lateral surfaces denotes at least one or more light sources.

An expander 150 is disposed between the light source 120 and the light path conversion sheet 130 to condense the light emitted from the light source 120 in a horizontal direction so as to diffuse it in a fan-shaped manner. Here, the expander 150 may include various types of lenses, hologram films, and the like for diffusing the light in a fan-shaped manner.

A plurality of scattering patterns 132, which are configured in a prism shape at regular intervals in a length direction of the light path conversion sheet 130, are formed on an upper surface of the light path conversion sheet 130 to change a light path so that the light diffused in a fan-shaped manner from the light source 120 and reflected through the reflecting plate 140 can be directed to the display panel 200.

The scattering patterns 132 may be formed with any pattern capable of diffusing and scattering light instead of a prism-shaped pattern. For example, the scattering patterns 132 may be formed in various forms such as a hemispherical pattern, a conical pattern or a dot pattern. Each of the scattering patterns 132 may be formed in a direction crossing a travelling direction of the light emitted from the light source 120, namely, a width direction of the light path conversion sheet 130.

The light path conversion sheet 130 may include a hologram film or the like using a diffractive optic in addition to a geometrical optical method such as a prism diffusion sheet, a reflector, and the like.

The reflecting plate 140 may also be formed with a curved-shaped mirror and disposed at an upper edge portion of the light path conversion sheet 130, namely, an upper surface of the light path conversion sheet 130 located at the farthest from the light source 120. Here, the reflecting plate 140 is configured such that both ends thereof are bent in an inward direction around the central portion to have a curved surface 140a. The reflecting plate 140 may include another shaped mirror other than a curved surface, and the mirror may include a reflecting member (including a hologram film or the like) using diffraction in addition to a geometrical optical mirror.

Accordingly, the reflecting plate 140 may be formed with a curved-shaped mirror to effectively reflect the light emitted from the light source so as to change a light path to be directed to the light path conversion sheet 130, thereby effectively performing a light path conversion even when a light guide plate is not used as compared with the backlight unit according to the related art.

Figure 6:
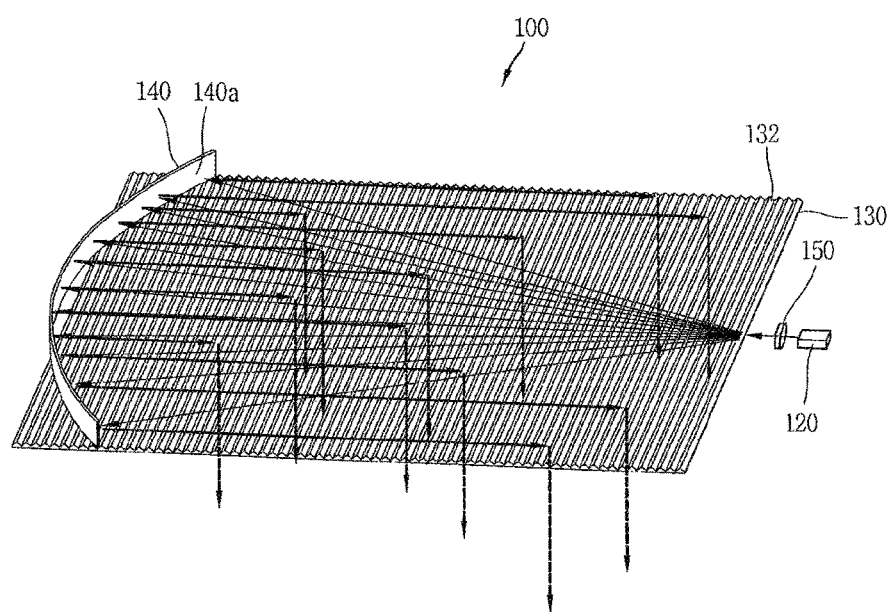
FIG. 6 is a schematic view illustrating a travelling path of a light emitted from a light source of a backlight unit applied to an image display device according to an embodiment of the present disclosure.

FIG. 6 is a schematic view illustrating a travelling path of a light emitted from a light source of a backlight unit applied to an image display device according to an embodiment of the present disclosure.

Referring to FIG. 6, the light emitted from the laser light source 120 is diffused and propagates in a horizontal direction through the expander 150, and is then reflected from a curved surface 140a of the reflecting plate 140 disposed at an upper edge portion of the light path conversion sheet 130 and directed to the light path conversion sheet 130.

A straight light reflected from the curved surface 140a of the reflecting plate 140 is refracted at a predetermined angle through a plurality of scattering patterns 132 formed on an upper surface of the light path conversion sheet 130 to change the light path to the display panel 200 below.

As described above, the light emitted from the light source 120 is reflected on the surface of the reflecting plate 140, and the light path is then changed through the light path conversion sheet 130. The light then propagates to the display panel 200, thereby implementing an image on the display panel 200. In this manner, a backlight unit according to an embodiment of the present disclosure may direct the light emitted from the light source 120 toward the display panel 200 using the light path conversion sheet 130 and the reflecting plate 140, even when a light guide plate is not used, thereby implementing planar images through the display panel 200.

Accordingly, a backlight unit according to an embodiment of the present disclosure may omit a wedge-type light guide plate formed by a special mold injection method, which may require difficult and expensive manufacturing processes, according to the related art. On the other hand, a backlight unit according to an embodiment of the present disclosure may not require such a light guide plate of the related art, thereby allowing lightweight and low profile designs as well as additionally capable of removing rigid mechanical structures.

A backlight unit of an image display device according to another embodiment of the present disclosure will now be described, which has the same configuration as the backlight unit illustrated in FIG. 5, except that a light source and a display panel are additionally disposed on a backlight unit.

Figure 7:
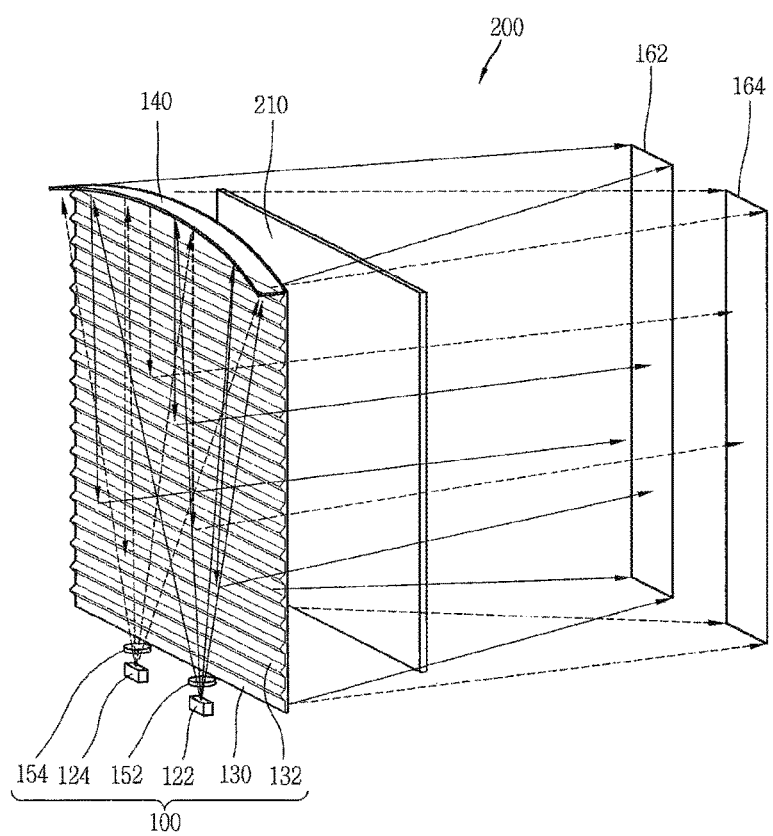
FIG. 7 is a perspective view schematically illustrating a stereoscopic image display device to which a backlight unit according to another embodiment of the present disclosure is applied.

FIG. 7 is a perspective view schematically illustrating a stereoscopic image display device to which a backlight unit according to another embodiment of the present disclosure is applied.

Referring to FIG. 7, a glasses-free stereoscopic image display device 200 according to another embodiment of the present disclosure may include a display panel 210 and a backlight unit 100. The display panel 210 is disposed at an upper portion of the backlight unit 100. The display panel 210 may be a liquid crystal display panel by way of example.

Although not shown in the drawing, the display panel 210 may include two substrates, with a liquid crystal layer between the two substrates. Data lines and gate lines (or scan lines) are formed to cross each other on a lower substrate of the display panel 210, and a thin film transistor array in which a plurality of pixels are disposed in a matrix is formed in cell regions defined by the data lines and gate lines. Each of the pixels of the display panel is respectively connected to a thin film transistor and driven by an electric field between a pixel electrode and a common electrode.

A color filter array including a black matrix, a color filter, and the like is formed on an upper substrate of the display panel 210. Furthermore, an alignment layer for setting a pretilt angle of liquid crystal is formed on the upper and lower substrates.

A plurality of spacers for maintaining a cell gap of liquid crystal cells are formed between the upper and lower substrates of the display panel 210. The common electrode is formed on the upper substrate in a vertical electric field driving method such as a twisted nematic (TN) mode and a vertical alignment (VA) mode, and formed on the lower substrate along with the pixel electrode in a horizontal electric field driving method such as an in-plane switching (IPS) mode and a fringe field switching (FFS) mode. The display panel 210 can be implemented in any liquid crystal mode such as the TN mode, the VA mode, the IPS mode and the FFS mode.

The display panel 210 displays a left-eye image and a right-eye image in a time division manner. The display panel displays a left-eye image for a first period of time and displays a right-eye image for a second period of time. For example, A 1-frame period can be, for example, divided into the first and second periods of time. The 1-frame period typically denotes a period during which image data are written on all pixels of the display panel 210.

Referring back to FIG. 7, the backlight unit 100 irradiates a left-eye convergence light through the first light source 122 to converge the light to the viewer's left-eye view zone 162 for a first period of time during which the display panel 200 displays a left-eye image, and irradiates a right-eye convergence light through the second light source 124 to converge the light to the viewer's right-eye view zone 164 for a second period of time during which the display panel 200 displays a right-eye image.

To this end, the backlight unit 100 may include the first and second light sources 122, 124, a light path conversion sheet 130 and a reflecting plate 140. In other words, the backlight unit 100 may include first and second light sources 122, 124 configured to provide light to the display panel 200, a light path conversion sheet 130 disposed adjacent to the light sources 122, 124, and a reflecting plate 140 disposed to face the first and the second light sources 122, 124 at an upper edge portion of the light path conversion sheet 130.

A laser light source is used for the first and second light sources 122, 124 in this embodiment, any light source such as a LED light source, a local field emission source, an organic light emitting array (not limited to them), and the like can be also used in addition to the laser light source. The first and second light sources 122, 124 may have a shape extended in a length direction along a lateral surface of the light path conversion sheet 130, and may be formed with one light source or a plurality of light sources in a row. It should be understood that the number and location of the first and second light sources 122, 124 are not limited, and each of the first and second light sources 122, 124 may include one or more light sources.

When implementing stereoscopic images using the backlight unit 100, the first and second light sources 122, 124 are configured to be individually turned on and off. More particularly, any one of a plurality of light sources for each of the first and second light sources is controlled to be on, and the remaining ones is controlled to be off such that different images are viewed from the viewer's left-eye and right-eye through the display panel 210 to implement a stereoscopic image. Here, each of the first and second lateral surfaces denotes at least one or more light sources.

Expanders 152, 154 are disposed between the first and second light sources 122, 124 and the light path conversion sheet 130 to condense the light emitted from the first and second light sources 122, 124 in a horizontal direction so as to diffuse the light in a fan-shaped manner. Here, the expanders 152, 154 may include all types of lenses, hologram films, and the like for diffusing light in a fan-shaped manner.

A plurality of scattering patterns 132, which are configured in a prism shape at regular intervals in a length direction of the light path conversion sheet 130, are formed on an upper surface of the light path conversion sheet 130 to change a light path so as to allow the light diffused in a fan-shaped manner from the first and second light sources 122, 124 and reflected from the reflecting plate 140 to be directed to the display panel 210. Here, the scattering patterns 132 may be formed with any pattern capable of diffusing and scattering light instead of a prism-shaped pattern. For example, the scattering patterns 132 may be formed in various shapes such as a hemispherical pattern, a conical pattern or a dot pattern. The scattering patterns 132 may be formed in a direction crossing a travelling direction of the light emitted from the first and second light sources 122, 124, namely, a width direction of the light path conversion sheet 130.

The light path conversion sheet 130 may include a hologram film or the like using a diffractive optic in addition to a geometrical optical method such as a prism diffusion sheet, a reflector, and the like. Accordingly, the light path conversion sheet 130 serves to change a light path so as to allow the light diffused in a fan-shaped manner from the first and second light sources 122, 124 and reflected from the reflecting plate 140 to be directed to the display panel 210, thereby allowing lightweight and low profile designs as well as additionally capable of removing rigid mechanical structures.

Furthermore, the reflecting plate 140 is formed with a curved-shaped mirror, and disposed at an upper edge portion of the light path conversion sheet 130, namely, an upper surface of the light path conversion sheet 130 located at the farthest from the first and second light sources 122, 124. Here, the reflecting plate 140 is configured such that both ends thereof are bent in an inward direction around the central portion to have a curved surface 140a. The reflecting plate 140 may include another shaped mirror other than a curved surface, and the mirror may include a reflecting member (including a hologram film or the like) using diffraction in addition to a geometrical optical mirror.

An image being converged to the viewer's left-eye and the right-eye through a glasses-free stereoscopic image display device according to another embodiment of the present disclosure will be described in detail with reference to FIGS. 8 through 11.

Figure 8:
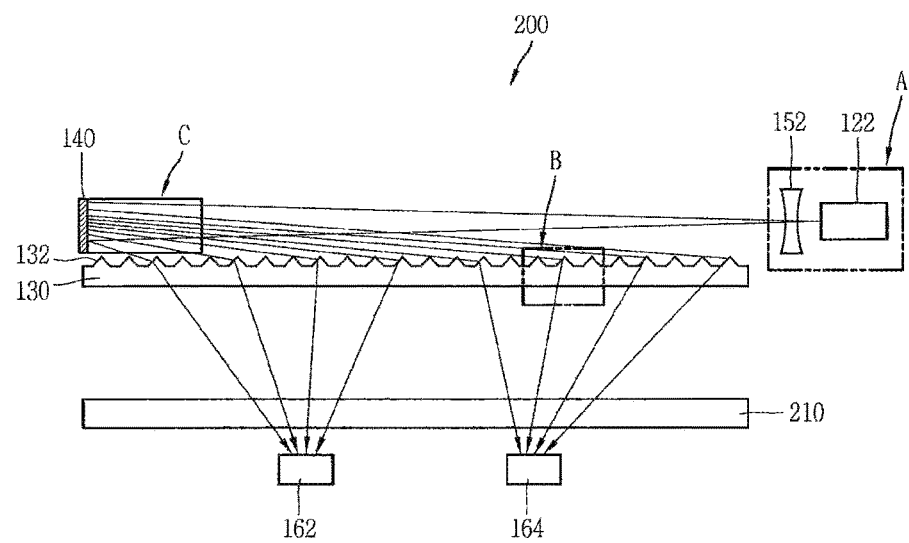
FIG. 8 is a view schematically illustrating a travelling path of a light emitted from a light source as a side view of a stereoscopic image display device to which a backlight unit according to another embodiment of the present disclosure is applied.
Figure 9:
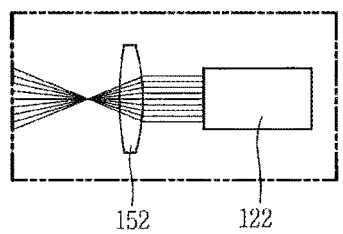
FIG. 9 is a plan view schematically illustrating light sources, an exit lens and travelling paths of beams emitted from the light sources as an enlarged plan view of portion "A" of FIG. 8.
Figure 10:
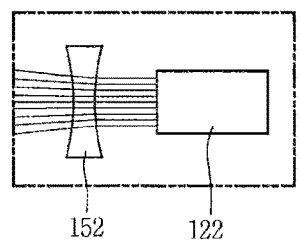
FIG. 10 is a side view schematically illustrating light sources, an exit lens and travelling paths of beams emitted from the light sources as an enlarged side view of portion "A" of FIG. 8.
Figure 11:
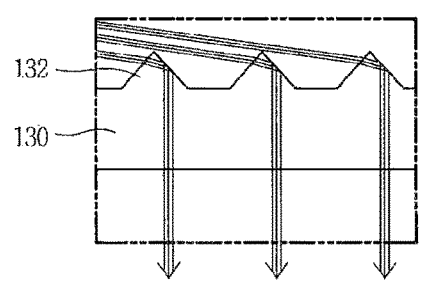
FIG. 11 is a side view schematically illustrating a light path conversion sheet and beam paths refracted and propagated from the light path conversion sheet as an enlarged side view of portion "B" of FIG. 8.

FIG. 8 is a view schematically illustrating a travelling path of a light emitted from a light source as a side view of a stereoscopic image display device to which a backlight unit according to another embodiment of the present disclosure is applied. FIG. 9 is a plan view schematically illustrating light sources, an exit lens and travelling paths of beams emitted from the light sources as an enlarged plan view of portion "A" of FIG. 8. FIG. 10 is a side view schematically illustrating light sources, an exit lens and travelling paths of beams emitted from the light sources as an enlarged side view of portion "A" of FIG. 8. FIG. 11 is a side view schematically illustrating a light path conversion sheet and beam paths refracted and propagated from the light path conversion sheet as an enlarged side view of portion "B" of FIG. 8.

Referring to FIG. 8, when the display panel 210 displays a left-eye image during a first period of time, the first light source 122 irradiates light but the second light source 124 does not irradiate light. A first light irradiated from the first light source 122 is diffused in a fan-shaped manner toward the reflecting plate 140 through the expander 152. As illustrated in FIG. 9, the first light irradiated from the first light source 122 is widely diffused and propagates in a horizontal direction, namely, in a direction of the reflecting plate 140 while passing through the expander 152. Also, as illustrated in FIG. 10, the first light is diffused in a horizontal direction but converged without being diffused in a vertical direction while passing through the expander 152, and propagates in a direction of the reflecting plate 140.

The first light widely propagating as described above is reflected on the curved surface 140a of the reflecting plate 140, and then the light path thereof is first converted into a straight light in parallel to the light path conversion sheet 130. As illustrated in FIG. 11, the first light first converted into a straight light as described above is then diffracted by the scattering patterns 132 formed on an upper surface thereof while propagating along a length direction of the light path conversion sheet 130, and the light path thereof is secondarily converted toward the display panel 210. Accordingly, as illustrated in FIG. 8, the secondarily converted first light is emitted in the viewer's direction by the scattering patterns 132 and entered into the viewer's left-eye view zone 162 through the display panel 210, thereby allowing the viewer to view a left-eye image through the left-eye view zone 162.

Meanwhile, when the display panel 210 displays a right-eye image during a second period of time, the second light source 124 irradiates light, but the first light source 122 does not irradiate light, as illustrated in FIG. 8. A second light irradiated from the second light source 124 is diffused in a fan-shaped manner toward the reflecting plate 140 through the expander (not shown, refer to reference numeral 154 in FIG. 7).

The second light widely propagating as described above is reflected on the curved surface 140a of the reflecting plate 140, and then the light path thereof is first converted into a straight light in parallel to the light path conversion sheet 130. As illustrated in FIG. 11, the second light first converted into a straight light as described above is diffracted by the scattering patterns 132 formed on an upper surface thereof while being propagated along a length direction of the light path conversion sheet 130 and the light path is secondarily converted toward the display panel 210. Accordingly, as illustrated in FIG. 8, the secondarily converted second light is emitted in the viewer's direction by the scattering patterns 132 and entered to the viewer's right-eye view zone 164 through the display panel 210, thereby allowing the viewer to view a right-eye image through the right-eye view zone 164.

A backlight unit according to an embodiment of the present disclosure and an image display device using the same may omit a wedge-type light guide plate formed by a special mold injection method, which may require difficult and expensive manufacturing processes, according to the related art. This also allows lightweight and low profile designs as well as capable of additionally removing rigid mechanical structures.

In addition, a backlight unit according to an embodiment of the present disclosure and an image display device using the same may use individual R, G and B laser light sources, thereby allowing a full-color representation as well as enhancing color tones. For example, when individual RGB LEDs are used rather than white LEDs (the same for laser), each coverable peak wavelength can be high and wide, thereby providing a wide range of expressible vivid colors. As compared with the conventional backlight units using individual RGB LEDs in which a separate member is provided for mixing colors, a backlight unit according to an embodiment of the present disclosure may have a longer optical distance such that individual colors are mixed prior to being emitted, thereby capable of implementing a full-white light source using RGB LEDs or RGB lasers.

Moreover, a backlight unit according to an embodiment of the present disclosure and an image display device using the same may use a polarized laser light source, thereby capable of removing one of the two polarized films that have been adhered to the conventional LCD device. The conventional LCD device typically includes two polarized plates with their polarization axes being at 90 degrees to adjust brightness by rotating the liquid crystal, which is an anisotropic material, between the two polarized plates. In other words, a laser light source according to an embodiment of the present disclosure may be a polarized light source, and the polarized light output can be well maintained on the light path throughout the backlight unit, thereby capable of removing one of the two polarized plates of the conventional LCD device.

Furthermore, a backlight unit according to an embodiment of the present disclosure and an image display device using the same may omit a wedge-type light guide plate and increase luminous efficiency by more than 300%.

It will be apparent to those skilled in the art that various modifications and variation can be made in the present invention without departing from the concepts and scope of the invention. Thus, it is intended that the present invention cover the modifications and variations of this invention provided they come within the scope of the appended claims and their equivalents.

What is claimed is:

1. A backlight unit for a display device, comprising:
a light path conversion sheet;
a light source above a first side of the light path conversion sheet; and
a reflecting plate above a second side opposite to the first side of the light path conversion sheet, the reflecting plate reflecting light directly emitted from the light source without intervening any optical members in substantially parallel with a light travel direction between the light source and a center portion of the reflecting plate,
wherein the light path conversion sheet directs the light reflected from the reflecting plate in a direction substantially perpendicular to the light travel direction between the light source and the center portion of the reflecting plate.

2. The backlight unit of claim 1, wherein the light path conversion sheet includes a plurality of patterns that are separated from each other along a length direction of the light path conversion sheet on an upper surface of the light path conversion sheet.

3. The backlight unit of claim 1, wherein the light path conversion sheet is one of a prism diffusion sheet, a reflector and a hologram film.

4. The backlight unit of claim 1, wherein the reflecting plate is a curved-shaped mirror.

5. The backlight unit of claim 1, wherein the light source is a laser light source, a light emitting diode (LED) light source or an organic luminescence emitted diode (OLED).

6. The backlight unit of claim 1, further comprising an expander between the light source and the light path conversion sheet that diffuses the light emitted from the light source toward the reflecting plate.

7. The backlight unit of claim 2, wherein the plurality of patterns are scattering patterns or prism patterns.

8. The backlight unit of claim 7, wherein the scattering patterns are hemispherical patterns, conical patterns or dot patterns.

9. An image display device, comprising:
a display panel configured to display a left-eye image and a right-eye image in a time division manner;
a first light source configured to irradiate a first light during a first period of time in which the left-eye image is displayed and a second light source configured to irradiate a second light during a second period of time in which the right-eye image is displayed;
a light path conversion sheet having a first side and a second side opposite the first side, the first and second light sources disposed above the first side; and
a reflecting plate disposed to face the first and second light sources above the second side of the light path conversion sheet,
wherein the reflecting plate reflects light directly emitted from the first and second light sources without intervening any optical members in substantially parallel with a light travel direction between the first and second light sources and a center portion of the reflecting plate,
wherein the light path conversion sheet directs the light reflected from the reflecting plate in a direction substantially perpendicular to the light travel direction between the first and second light sources and the center portion of the reflecting plate.

10. The image display device of claim 9, wherein a plurality of prism patterns are formed to be separated from each other along a length direction of the light path conversion sheet on an upper surface of the light path conversion sheet.

11. The image display device of claim 9, wherein the light path conversion sheet is one of a prism diffusion sheet, a reflector and a hologram film.

12. The image display device of claim 9, wherein the reflecting plate is a curved-shaped mirror.

13. The image display device of claim 9, wherein the light source is a laser light source, a light emitting diode (LED) light source or an organic luminescence emitted diode (OLED).

14. The image display device of claim 13, wherein when the light source is a laser light source, an expander is disposed between the laser light source and the light path conversion sheet.

15. An image display device having a display panel and a light source, comprising:
a light path conversion sheet on the display panel; and
a reflecting plate above a second side of the light path conversion sheet, the reflecting plate reflecting light directly emitted from a light source disposed to face the reflecting plate above a first side of the light path conversion sheet,
wherein the light path conversion sheet includes a plurality of scattering patterns, which are configured in a prism shape at regular intervals in a length direction of the light path conversion sheet, on an upper surface of the light path conversion sheet,
wherein the reflecting plate reflects the light emitted from the light source in substantially parallel with a light travel direction between the light source and a center portion of the reflecting plate,
wherein the light path conversion sheet directs the light reflected from the reflecting plate toward the display panel under the light path conversion sheet through the plurality of scattering patterns on the light path conversion sheet.

16. The image display device of claim 15, further comprising an expander between the light source and the light path conversion sheet that diffuses the light emitted from the light source and directs the diffused light toward the reflecting plate.

17. The image display device of claim 15, wherein the reflecting plate is a curved-shaped mirror.

18. The image display device of claim 15, wherein the light source is a laser light source, a light emitting diode (LED) light source or an organic luminescence emitted diode (OLED).

* * * * *